United States Patent Office 2,868,495
Patented Jan. 13, 1959

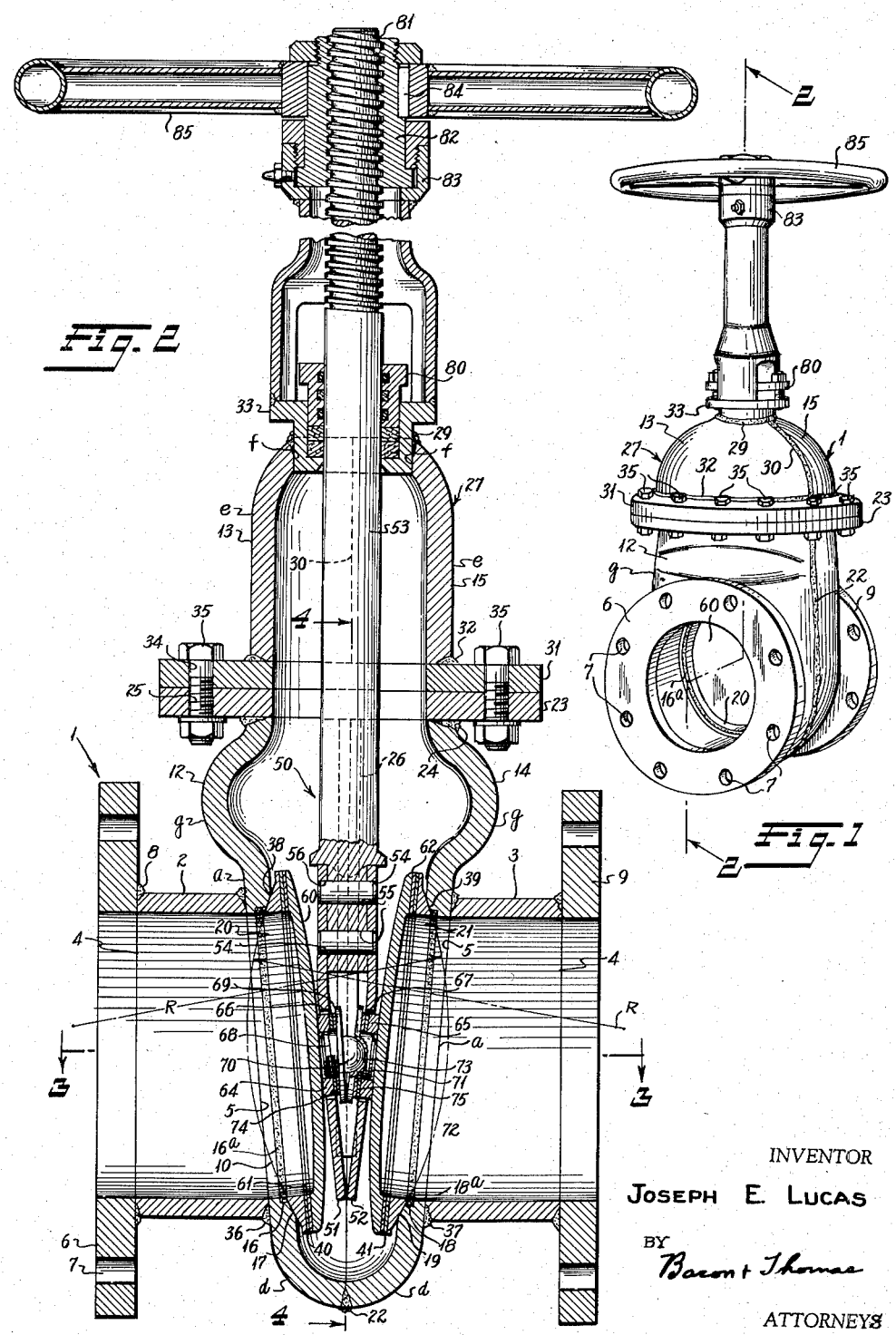

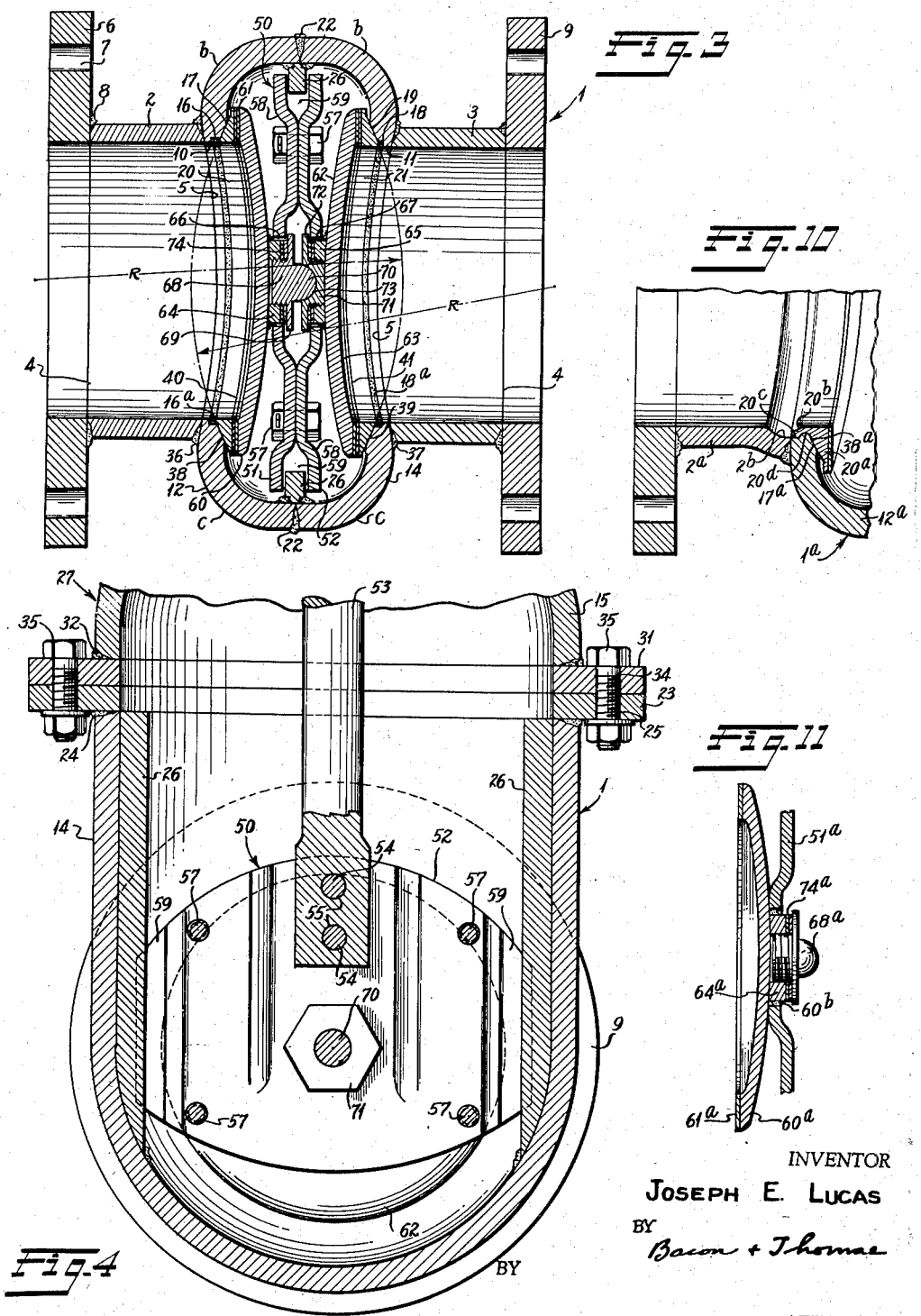

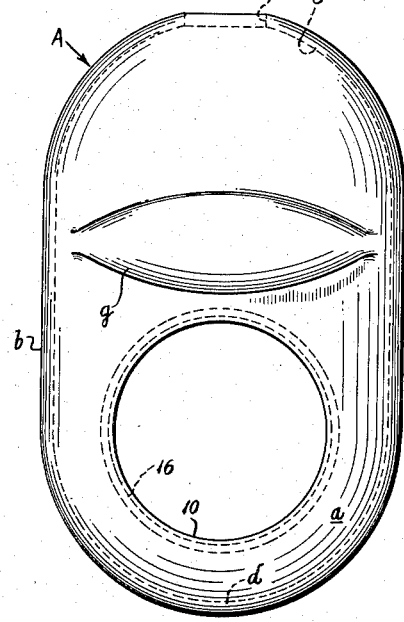
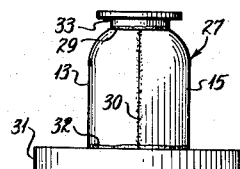
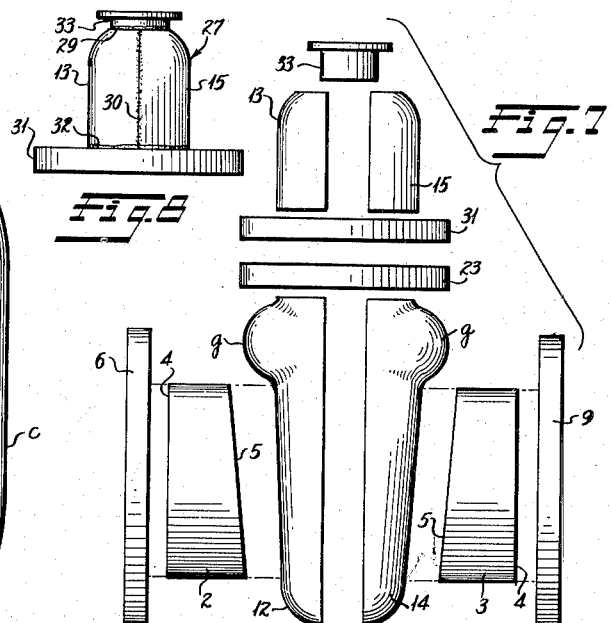
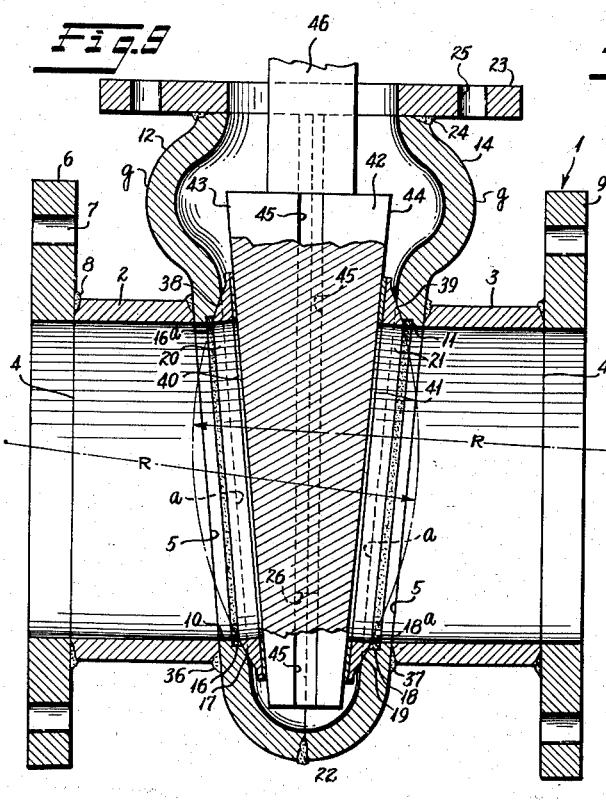
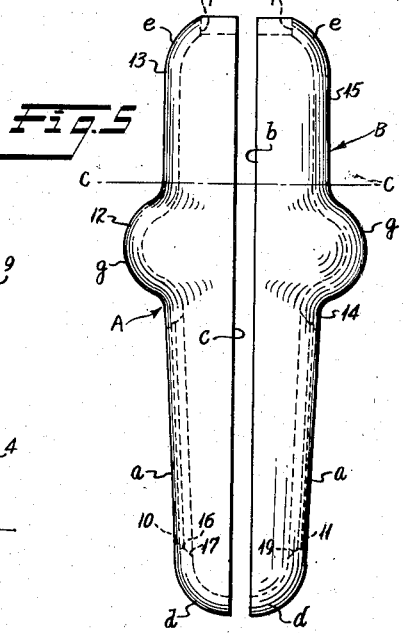

2,868,495

FABRICATED GATE VALVE AND METHOD OF MAKING THE SAME

Joseph E. Lucas, Caracas, Venezuela

Application December 15, 1953, Serial No. 398,402

7 Claims. (Cl. 251—86)

The present invention relates to valves, and more particularly to a gate valve fabricated almost entirely from conventional flat and cylindrical stock of appropriate thickness.

The principal object of the invention is to provide a fabricated valve that can be made in large sizes, and which will withstand high pressures, but which nevertheless can be readily manufactured at a relatively low cost compared to that of cast valves of the same capacity and strength. In this connection, the present fabricated gate valve is stronger and weighs less than a cast iron valve of corresponding size and has the strength of a cast steel valve of corresponding size, but also costs and weighs less than such cast steel valve. Another advantage of the present valve over cast iron valves is that it will eliminate the fire hazard resulting from using cast iron valves in oil well piping, since it is not subject to cracking when subjected to high heat temperatures, which is an inherent fault of cast iron valves.

Another object is to provide a gate valve wherein the seats, gate and other components can be machine-finished on high production machines (that is, turret lathes, automatic grinding machines, etc.), before final assembly.

Another object is to provide a valve structure that is designed so that the principal parts thereof can be readily and permanently secured together by flash welding or by any other suitable type of welding.

Another object is to provide a gate valve construction and method according to which the valve seat supporting surfaces and the valve seats are of a self-aligning nature and the seats are caused to assume a proper position of angular alignment with respect to the valve body for proper subsequent engagement by the gate, during the process of fabricating the valve.

Another object is to provide a welded gate valve wherein the locked-in body weld stresses due to prior welding operations, and minor dimensional variations and manufacturing tolerances are compensated for by providing valve seat supporting surfaces and valve seats engageable therewith in a manner rendering the valve seats self-aligning, and by pressing a master gate gauge between the valve seats to align them with the master gate seating surfaces by oscillating said valve seats on their supporting surfaces while the valve body is held under "mechanical" stress created by the master gate gauge, to thereby minimize the effect of the locked-in weld stresses on subsequent assembly operations, and on the valve itself when in use.

Another object is to provide a method of making a fabricated gate valve, wherein the seats of the valve are manually pre-positioned during the assembly of the valve, and the valve body is pre-stressed during such assembly by a master gate gauge so that the seats are forced to occupy the position they will be subsequently required to assume, to accommodate the regular gate in its fully closed position without distortion of the valve body.

Another object is to provide a gate valve construction including parts adapted to be formed by conventional stamping or forging operations. In this connection, one of the novel features of the invention resides in providing a pair of similar, dished or hollow stampings or forgings adapted to be severed transversely to form upper and lower components weldable together to respectively form a central body portion or housing for the gate, and a bonnet for the valve, said body portion having walls substantially parallel to the desired inclination of the valve seats.

Another object is to provide a high pressure fabricated gate valve and method of making the same in accordance with which the interior of the valve is free from inwardly extending projections that would cause corrosive cavitation, eddying, and restriction to free flow.

Still another object is to provide a novel gate construction for a gate valve including valve disk members of a resilient nature and construction adapting the same to make sealing contact with their associated seats irrespective of any minor distortion that may be present in said seats.

A further object is to provide a gate for a gate valve including a pair of disks and a stem construction of such nature that closing pressure is applied to the disks at substantially the central portion thereof.

A still further object is to provide a gate for a gate valve including valve disks arranged so that they automatically align themselves into flush contact with the seats of the valve.

A still further object is to provide a gate valve having disks which are adjustably mounted and are adapted to be maintained a predetermined distance apart, but which are, nevertheless, self-aligning with their associated seats and interengage each other at the back thereof with a swivel or ball and socket connection.

A still further and important object is to provide a gate valve construction wherein maintenance costs are reduced to a minimum by providing body seats that can be resurfaced by conventional equipment, and by further providing a gate structure that can be removed from the valve, and including valve disks that can be removed from the gate and resurfaced, and then reassembled on the gate and the gate reinstalled in the valve body, the valve disks being mounted so that their spacing can be readjusted during reassembly by using spacing shims to bring the gate disks into proper index with the body seats, thereby making it unnecessary to scrap the used gate structure and to substitute a new one, as is now common practice.

Other objects and features of the invention will be apparent from the following description taken in conjunction with the accompanying drawings, in which:

Fig. 1 is a perspective view of a complete gate valve constructed in accordance with the principles of the present invention;

Fig. 2 is a vertical sectional view through the gate valve shown in Fig. 1 taken along the line 2—2 of Fig. 1;

Fig. 3 is a horizontal sectional view through the valve taken on the line 3—3 of Fig. 2;

Fig. 4 is a fragmentary vertical sectional view taken through the valve on the line 4—4 of Fig. 2 and particularly illustrating a portion of the gate structure of the valve;

Fig. 5 is a front elevational view of a pair of stampings or forgings which are adapted to be transversely divided to form upper and lower components adapted to be welded together to form a central valve body portion and a bonnet portion for the valve, respectively;

Fig. 6 is a side elevational view of one of the stampings shown in Fig. 5;

Fig. 7 is a schematic view illustrating the component parts from which the valve body and bonnet are formed;

Fig. 8 is an elevational view showing the components of the bonnet in assembled relation;

Fig. 9 is a view showing the component parts of the valve in assembled relation and illustrating the final step in the method of making the valve body, wherein the self-aligning valve seats are held in place by a wedge or master gate gage in order to pre-stress the body of the valve and to position the valve seats in final alignment to accommodate the regular gate to be later assembled with the valve;

Fig. 10 is a fragmentary sectional view illustrating a modified form of valve seat mounting; and Fig. 11 is a fragmentary sectional view illustrating a modified form of mounting for the valve disks.

Referring now to Figs. 1 and 2 of the drawings, the body of the gate valve is generally identified by the numeral 1 and comprises similar nozzle or cylindrical sections 2 and 3 cut from steel tubing of the desired diameter and thickness. Each of the cylindrical sections 2 and 3 has a straight outer end 4 and an inclined inner end 5. A flange or ring member 6 is provided with suitable bolt holes 7 and may be formed by stamping the same from steel sheet stock. The flange 6 is welded to the straight end 4 of the cylindrical section 2, as indicated at 8, and serves as a mounting flange for one end of the valve. A similar flange or ring member 9 is welded to the straight end 4 of the other cylindrical section 3 and serves as a mounting flange for the opposite end of the valve. It will be understood that when a flange mounting is not desired, the ring members 6 and 9 are omitted and the outer ends of the cylindrical sections 2 and 3 are threaded instead.

In order to simplify the design of the valve body and to minimize manufacturing costs, the central portion of the body is fabricated from steel plate material in the form of a pair of similar stampings or forgings, respectively identified as A and B in Fig. 5. Each of these stampings is in the form of an elongated hollow, dished section including a main wall portion *a* which merges at its sides into curved wall portions *b* and *c* and at its bottom into a curved wall portion *d*. The main wall portion *a* merges at its upper end into a curved wall portion *e* provided with a substantially semi-circular recess *f*. Each of the sections A and B is also provided with an intermediate transversely extending bulged portion, *g*, which serves to stiffen the wall *a*.

The stampings A and B have the main wall portion *a* thereof below the bulges *g*, inclined to the vertical and provided with valve seat openings 10 and 11, respectively, which will be described in further detail hereinafter. These stampings are adapted to be severed in a region above the bulges *g*, to-wit, along the line C—C, so that the stamping A is divided into a body portion 12 and a bonnet portion 13. The stamping B is similarly divided into a body portion 14 and a bonnet portion 15.

The openings 10 and 11 in the body portions 12 and 14 are equal to the inner diameter of the cylindrical sections 2 and 3, respectively. After the cylindrical sections 2 and 3 have been welded to the body portions 12 and 14, respectively, as will be described later, the opening 10 is finish-bored and counterbored as indicated at 16, Figs. 2, 5, and 9, and the inner portion of the counterbored region is made concave to form a valve seat supporting surface 17 conforming to a portion of a sphere generated by the radius R. The concave seat supporting surface 17 may be formed by machining or grinding, or by first machining and then grinding to the desired final finish. The opening 11 in the body section 14 is similarly finished and provided with a similar counterbore 18 and a concave valve seat supporting surface 19. The counterbores 16 and 18 are adapted to function as welding grooves, as will be set forth more fully hereinafter. The concave portions 17 and 19, respectively, serve as supports for self-aligning valve seats 20 and 21, as will also be described more fully hereinafter. The counterbores 16 and 18 and the concave surfaces 17 and 19 may be formed in the stampings A and B either before or after said stampings have been severed along the line C—C. In any event, the edges of the curved wall portions *b*, *c*, *d*, and *e* are preferably ground or otherwise trued up so that they will lie in a common plane before the stampings A and B are severed, and so that the inclined wall portions *a*, containing the seat openings 10 and 11 will lie substantially parallel to the desired angles of the valve seats when the body components 12 and 14 are later assembled.

In assembling the cylindrical body sections 2 and 3 with the central body components 12 and 14, respectively, the inclined end 5 of the cylindrical section 2 is disposed in concentric relation with the opening 10 in the body component 12 and the inclined end 5 of the cylindrical section 3 is disposed in concentric relation with the opening 11 in the body component 14. The cylindrical section 2 is then flash or otherwise welded to the component 12 as indicated at 36, and the cylindrical section 3 is similarly welded to the component 14 as indicated at 37.

The central portion of the valve body 1 is completed by placing the finished lower components 12 and 14 in confronting relation with their edges in abutment. These components are then welded together along their abutting edges as indicated at 22 in Fig. 3. The welding may be effected by either flash welding or by any other conventional or suitable welding process. A flange or ring member 23 similar to the members 6 and 9 is welded to the upper ends of the body components or sections 12 and 14, as indicated at 24, the member 23 being provided with bolt holes 25 to enable the same to serve as a bolting flange. Guide strips 26 are welded in an upright position at diametrically opposed regions to the inner surface of the valve body sections 12 and 14, and function as guides for the valve gate, as will be explained more fully hereinafter.

The assembly of the valve body 1 is now complete except for the mounting therein of the valve seats 20 and 21. The valve seat 20 includes a convex portion 38, which is finished on the same radius as the radius R so that the surface 38 is complemental to the surface 17. The seat 21 is provided with a similar convex surface 39 complemental to the surface 19. The seat 20 has a facing 40 secured thereto, which may be made of stainless steel or other material that will provide a suitable surface for engagement by a gate valve disk. The valve seat 21 is provided with a similar facing 41. Thus, the valve seats 20 and 21 are completed in all respects prior to their mounting in the valve body 1.

The seats 20 and 21 are assembled with the main body 1 by manually positioning the convex portion 38 of the seat 20 in engagement with the concave surface 17, and positioning the seat 21 with its convex surface 39 in engagement with the concave surface 19. Thus, the seats 20 and 21 are first manually positioned in approximately the position they are to permanently occupy. Thereafter, a wedge member or master gate gage 42, Fig. 9, having the same external dimensions and angularly inclined faces as the valve disks of the regular gate, is inserted between the seats 20 and 21. More specifically, master gate gage 42 has inclined surfaces 43 and 44 on the opposite sides thereof which engage the seat facings 40 and 41, respectively. The master gate gage 42 is also provided with grooves 45 which engage the gate guides 26 to thereby position said master gate gage in centralized relation to the seats 20 and 21. A stem 46 is secured to the master gate gage 42 and force is applied therethrough to the master gate gage to oscillate, if necessary, and press the seats 20 and 21 into final position and at the same time to mechanically pre-stress the valve body 1 to compensate for locked-in welding stresses by subjecting the body to at least the maximum force that will be applied thereto by the regular gate when the gate is moved to its fully closed position. This technique assures that the seats 20 and 21 will assume the desired angular relation and also that the valve body 1 and seats 20 and 21 will not be distorted in use when the regular gate is moved to fully closed position. As has been previously noted, the wall portions *a* of the body sections 12 and 14 are inclined so that they are substantially parallel to the desired seat angle. Hence, when the convex surfaces on the valve seats 20 and 21 and the concave seat supporting surfaces on the valve body portions 12 and 14 are brought into engagement, said seats can automatically oscillate to align themselves with the inclined faces 43 and 44 of the master gate gage 42. The necessary force to be applied to the master gate gage 42 can be provided by a hydraulic ram or other suitable means (not shown).

The valve seats 20 and 21 are preferably welded in place while held in position by the master gate gage 42 and while the body portion is subjected to stress by said gage, the seat 20 being secured to the body portion 1 by the deposition of welding material 16a in the welding groove 16, and the seat 21 being secured to the body section 12 by the deposition of welding material 18a in the welding groove 18. As will be apparent, the object in pre-stressing the valve body during the mounting of the valve seats 20 and 21 therein is to assure that the regular gate will engage said seats and form a leak-proof seal therewith, without producing any undue stresses or strains in the valve body or causing distortion in the valve seats.

The master gate gage 42 is next removed and the welds 16a and 18a are ground smooth to eliminate all obstruction to free flow through the valve.

The bonnet of the valve (Fig. 8) is generally identified by the numeral 27 and comprises the components 13 and 15 of the stampings A and B. The sections 13 and 15 are positioned with their finished confronting edges in abutting relation, and are then flash welded or otherwise welded together, as indicated at 30 in Fig. 8. A flange or ring member 31, similar to the ring member 23 is welded to the lower edges of the sections 13 and 15, as indicated at 32. After these welding operations, the semi-circular recesses *f* at the upper ends of the sections 13 and 15 are machined to final size. A cylindrical boss 33 for a stuffing box is then positioned in the semi-circular openings *f* and welded in place as indicated at 29. The flange member 31 has bolt holes 34 which register with the bolt holes 25 in the member 23, and a plurality of bolts 35 extend through these openings to secure the bonnet 27 to the central portion of the valve body 1, in the final assembly of the bonnet 27 with the gate valve.

It is preferred to employ the gate construction disclosed in Figs. 2, 3, and 4, with the valve body described hereinabove. The present gate is generally identified by the numeral 50 and comprises a pair of confronting guide plates 51 and 52, which can also be readily formed by stamping the same from flat stock. These plates are shaped so that they are spaced apart at their upper ends to receive the lower end of a valve stem 53 therebetween, and converge at their lower ends, as best shown in Fig. 2. The stem 53 carries vertically spaced pins 54, which are press-fitted into openings 55 formed therein. The pins 54 project beyond opposite sides of the stem 53 and are received in openings 56 in the plates 51 and 52, respectively. The plates 51 and 52 are maintained in assembled relation with the stem pins 54 and are secured to each other by a plurality of bolts 57 which extend therethrough adjacent the opposite ends thereof. The bolts 57 are located adjacent off-set regions 58 formed in the plates 51 and 52 at the opposite ends thereof to provide grooves 59 adapted to receive the gate guides 26. Thus, the gate assembly 50 is guided for vertical movement within the central portion of the valve body.

A steel valve disk 60 of a diameter at least equal to that of the seat 20 is preferably formed by stamping the same from flat stock. The disk 60 is of generally concavo-convex formation and has a flat outer marginal portion to which a facing 61 is secured and adapted to engage with the seat facing 40. A similarly formed disk 62 has a facing 63 thereon adapted to engage with the facing 41 on the seat 21. An internally threaded ring 64 is welded to the convex side of the disk 60 in alignment with the axis thereof. A similar ring 65 is welded to the convex side of the disk 62. The ring 64 is adapted to project with slight clearance through an opening 66 in the plate 51 and the ring 65 is adapted to similarly project through an opening 67 in the plate 52. A fitting 68 is threaded into the ring 64 and has a flange 69 larger in diameter than the opening 66 in the plate 51, whereby to retain the valve disk 60 in assembled relation with the plate 51 while permitting some freedom of universal movement of said disk relative to said plate. The fitting 68 has a partially spherical projection 70 disposed inwardly of the flange 69. On the other hand, a fitting 71 is threaded into the ring 65 and has a flange 72 of a larger diameter than the opening 67 in the plate 52 for somewhat loosely retaining the disk 62 in assembled relation with said plate. However, the fitting 71 has a partially spherical socket or recess 73 which serves as a seat for the mating projection 70. Suitable shims 74 are mounted between the ring 64 and the flange 69 of the fitting 68 and similar shims 75 are mounted between the ring 65 and the flange 72 of the fitting 71. The purpose of these shims is to provide for proper relative adjustment of the valve disks 60 and 62 to maintain the same spaced a predetermined distance apart, so that tight engagement thereof with their associated seats 20 and 21 will be effected when the gate 50 is in fully closed position. At the same time, the spherical projection 70 and the concave recess 73 provide a swivel or ball and socket connection between the disks 60 and 62, at the rear side thereof, enabling the same to assume a position in self-alignment with the seats 20 and 21, respectively. There is, of course, sufficient clearance between the rings 64 and 65 and the openings 66 and 67 in the plates 51 and 52 to permit the necessary movement of the disks 60 and 62 relative to said plates. Moreover, the disks 60 and 62 are formed from resilient material, so that they can distort slightly, if necessary, in order to form a perfect seal with their associated seats 20 and 21, respectively.

It is to be understood, of course, that the disks 60 and 62 are assembled with their associated plates 51 and 52, before the plates are finally bolted together to secure them to the valve stem 53.

By way of summary of the assembly sequence of the valve body parts, the cylindrical sections 2 and 3 are welded to the body portions 12 and 14, respectively. If the valve is to have a flange mounting, then the other ends of the cylindrical sections 2 and 3 are welded to the ring members 6 and 9, respectively, otherwise they will be threaded. The thus partially assembled valve body portions 12 and 14 are then machined and/or ground to finish the openings 10 and 11 and to provide the counter bores 16 and 18 and the concave valve seat supporting surfaces 17 and 19. The edges of the body sections A and B are then finished and the bonnet portions 13 and 15 severed therefrom along the line C—C. The body portions 12 and 14 are then welded together along their confronting edges as indicated at 22, and the flange ring 23 is welded to the upper ends of said body portions. The gate guides 26 are next welded in place within the body portions 12 and 14. The finished valve seats 20 and 21 are then positioned in engagement with the valve seat supporting surfaces 17 and 19. The master gate gage 42 is then pressed into position producing compensating fiber stresses in the body to thereby "mechanically" stress-relieve the locked-in welding stresses in the body, and at the same time cause the valve seats 20 and 21 to oscillate relative to their supporting surfaces 17 and 19 to assume a final position for leak-proof engagement by the regular gate. The valve seat 20 and 21 thus assume a stable position and the valve body is conditioned so that it will not be distorted when the regular gate is moved to its fully closed position. Finally, the valve seats 20 and 21 are permanently fixed in place by the welding 16a and 18a to complete the valve body assembly.

The remaining structure of the gate valve is substantially conventional. That is to say, the upper portion of the stem 53 extends through a stuffing box gland 80 mounted in the stuffing box boss 33. Likewise, the upper end of the stem 53 is threaded as indicated at 81 and is engaged by a nut 82 mounted upon a housing 83, the nut 82 being secured by a key 84 in a conventional manner to a hand wheel 85 adapted to rotate the nut 82 to effect reciprocating movement of the valve stem 53 between open and closed positions. It will be readily understood by those familiar with the art that rotation of the hand wheel 85 in one direction will cause the valve stem 53 to move downwardly and thereby cause the valve disks 60 and 62 to engage with the seats 20 and 21, respectively. On the other hand, rotation of the hand wheel 85 in the opposite direction will cause movement of the valve stem 53 in an upward direction to retract the valve disks 60 and 62 from their seats 20 and 21, respectively, to thereby effect opening of the valve.

As has been noted hereinbefore, the plates 51 and 52 of the valve gate 50 may be formed by stamping the same from flat stock. This is also the case with the various ring members 6, 9, 23 and 31. The bolt holes in these rings can be punched simultaneously with the stamping of the rings, if desired, or punched or drilled later. Thus, the entire valve body, bonnet, and the gate parts can be readily fabricated from conventional sheet or cylindrical steel stock and subsequently welded or otherwise secured together in an inexpensive manner to provide the fabricated valve described.

One of the highly desirable features of the present valve construction is that it lends itself to easy servicing at low maintenance costs. Thus, if it should become necessary to service the valve seats 20 and 21, the bonnet 27 and the gate assembly 50 can be readily removed by taking out the bolts 35 and the valve seats refinished by conventional machining and/or grinding apparatus. Again, if the valve disks 60 and 62 require servicing, they can readily be detached from the stem 53 and plates 51 and 52 by removing the bolts 57 and unscrewing the fittings 68 and 71. Here again, the servicing of the disks 60 and 62 can be effected by using conventional equipment. Upon reassembly of the disks 60 and 62 with the plates 51 and 52, shims of appropriate thickness can be added to the shims 74 and 75 to compensate for any change in the spacing that resulted from the aforesaid servicing operation, so that the disks 60 and 62 can be mounted in properly spaced relation to engage the seats 20 and 21 in the same manner, as when the valve was new. The feature of detachably mounting the disks 60 and 62 on the stem 53 makes it possible to overhaul the gate assembly 50 and reuse the parts, instead of discarding the same, as is the common practice with other gate valve constructions.

Fig. 10 illustrates a modified method of mounting the valve seats in the valve body. Thus, a valve seat 20a is shown provided with an axially projecting lip 20b, which is initially formed cylindrical and later deformed by rolling the same into a groove 20c and over a ridge 20d projecting inwardly from a body component 12a adjacent a concave valve seat supporting surface 17a. The valve seat 20a has a concave surface 38a engaging the surface 17a to render the seat 20a self-aligning when engaged by the master gate gage 42 and the valve body is pre-stressed, as aforedescribed. It is while the seat 20a is held in position by the master gate gage 42 and the valve body 1a is pre-stressed, that the lip 20b is rolled or crimped over the ridge 20c to mount said seat in place in fluid-tight relation with the body. The cylindrical member 2a is belled or enlarged prior to welding thereof to the body portion 12a, as indicated at 2b to facilitate the rolling operation. It is to be understood, of course, that a similar second seat, corresponding to the seat 21, is mounted in the body 1a along with the seat 20a. Thus, the valve seats may be permanently mounted in place by means other than welding.

Fig. 11 illustrates a modified form of mounting for the valve disks wherein a valve disk 60a, similar to the valve disk 60 is shown welded at 60b to the gate plate 51a and to the ring 64a, a fitting 68a and shims 74a being associated with the ring 64a in the same manner as the fitting 68 and shims 74 are associated with the ring 64, previously described. A facing 61a is secured to the disk 60a. Thus, the disk 60a is rigidly mounted on the plate 51a, but in view of the resilience of said disk it will readily seat and form a seal with any seat associated therewith, for example, the seat 20. It will be understood that a second valve disk corresponding to the valve disk 62 will be similarly mounted on the gate for cooperation with a seat corresponding to the seat 21.

It is also to be understood that changes may be made in the particular shape of the components of the valve body, bonnet and gate, and that the parts may be fabricated and assembled in an order of steps other than specifically described herein, without departing from the principles of the invention or the scope of the annexed claims.

I claim:

1. A gate valve, comprising, a body, a pair of valve seats in said body, said valve seats being downwardly inclined toward each other; and a gate structure including a stem, a pair of plates, means fixedly securing said plates to said stem, a pair of valve disks, each of said plates having an opening formed therein, each of said valve disks having fastening means projecting therefrom and extending through an opening in one of said plates, and means attaching said valve disks to said plates including elements maintaining said valve disks spaced a predetermined distance apart and providing a ball and socket engagement between said valve disks.

2. A gate valve as defined in claim 1, in which the valve disks have significant resilience within normal operating pressures and are concavo-convex.

3. A gate valve as defined in claim 1, in which the means securing the valve disks to the plates is located at substantially the center of said valve disks.

4. A gate valve as defined in claim 1, in which the valve body has diametrically opposed guides, and the opposite ends of the plates are spaced apart to receive said guides.

5. A gate valve, comprising: a body including similar hollow confronting central sections, said sections having abutting edges and being welded together along the sides and bottom of said abutting edges; an annular member welded to the upper end of said sections, said sections having converging wall portions disposed at angles substantially corresponding to the desired seat angles and provided with a seat opening and a spherically concave seat supporting surface surrounding said opening; a valve seat having a convex surface engaged with each of said seat supporting surfaces, whereby said valve seats can be readily aligned with each other during assembly thereof with said sections and are properly positioned to effect leakproof engagement with a gate, each of said sections having a wedling groove disposed outwardly of its associated seat; welding material in said grooves securing said seats to said sections; a cylindrical section disposed outwardly of each of said central sections, said cylindrical sections being disposed in substantially axial alignment with the seat openings in said central sections and having inclined ends abutting said central sections and being welded thereto, each of said cylindrical sections also having a vertical end; and an annular member welded to the vertical end of the respective cylindrical sections.

6. In a method of making a gate valve, the steps comprising: providing a body portion having downwardly converging confronting seat openings and a generally spherical concave seating surface at the inner edge of each of said seat openings; forming a pair of valve seats of uniform transverse dimension and with a convex seating surface complemental to the seating surfaces on said body portion so that the seating surface of said valve seats will lie substantially parallel to the downwardly converging walls of the body portion; engaging the convex surface of the valve seats with the concave surfaces of said body portion; inserting a master gate gage between said valve seats and in engagement with said valve seats to position the same in approximately the desired relation in said body portion; applying force to said master gate gage to rotate the plane of said valve seats about the center of said spherical seating surface and into final position relative to said body portion; and then securing said seats in place in said body portion.

7. In a method of making a gate valve, the steps comprising: forming a pair of similar, dished, hollow body sections, each section having a substantially flat main wall portion inclined from the vertical and provided with a seat opening, said main wall portions each merging into curved walls at the sides and lower ends thereof; welding one end of a cylindrical section to the outer side of each section in axial alignment with the opening therein; thereafter forming a spherically concave seating surface at the inner edge of each of said seat openings; positioning said sections in confronting relation with their edges in abutting engagement and welding said sections together at said abutting edges; forming a pair of annular valve seats of uniform transverse dimension and with a convex seating surface complemental to the seating surfaces on said body sections; engaging the convex surface of the valve seats with the concave surfaces of said body sections so that the seating surface of said valve seats will lie substantially parallel to the downwardly converging walls of the body portion; inserting a tapered master gate gage between said valve seats and in engagement with said valve seats to position the same in approximately the desired angular relation to said body sections; applying force to said master gate gage to oscillate the plane of said valve seats about the centers of said concave surfaces and into their final position and to pre-stress said body sections; and then securing said seats in place in said body sections while said body sections are pre-stressed.

References Cited in the file of this patent

UNITED STATES PATENTS

| | | |
|---|---|---|
| 284,122 | Dover | Aug. 28, 1883 |
| 709,491 | Kennedy | Sept. 23, 1902 |
| 710,986 | Lunken | Oct. 14, 1902 |
| 1,498,018 | Cronkhite et al. | June 17, 1924 |
| 1,765,717 | Ericsson | June 24, 1930 |
| 2,075,123 | Lunken | Mar. 30, 1937 |
| 2,569,412 | Fennema | Sept. 25, 1951 |
| 2,627,651 | MacGregor | Feb. 10, 1953 |

FOREIGN PATENTS

| | | |
|---|---|---|
| 515,095 | Great Britain | Nov. 27, 1939 |
| 522,126 | Great Britain | June 10, 1940 |
| 156,784 | Austria | Aug. 25, 1939 |